T. F. Strong.
Lamp.
Nº 4,621. Patented Jul. 7, 1846.

UNITED STATES PATENT OFFICE.

THEO. F. STRONG, OF LONDON, ENGLAND.

LAMP.

Specification of Letters Patent No. 4,621, dated July 7, 1846; Antedated May 1, 1846.

*To all whom it may concern:*

Be it known that I, T. F. STRONG, a citizen of the United States, now a resident of London, England, have invented several new and useful Improvements in Lamps, and that the following is a full, clear, and exact description of the principle or character thereof, which distinguishes it from all other things before known, and of the manner of making, constructing, and using the same, reference being had to the accompanying drawings, making part of this specification, in which—

Figure 1:
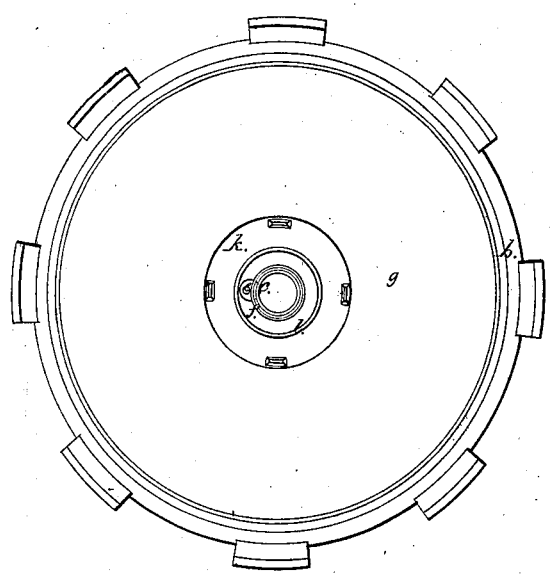
Figure 2:
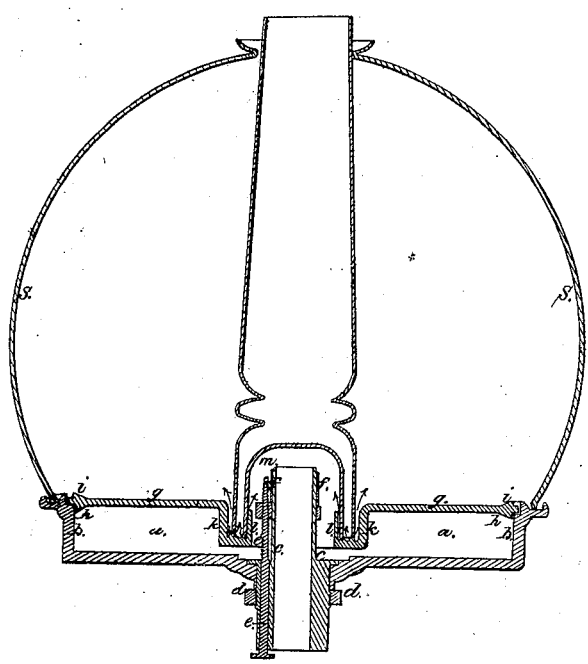
Figure 3:
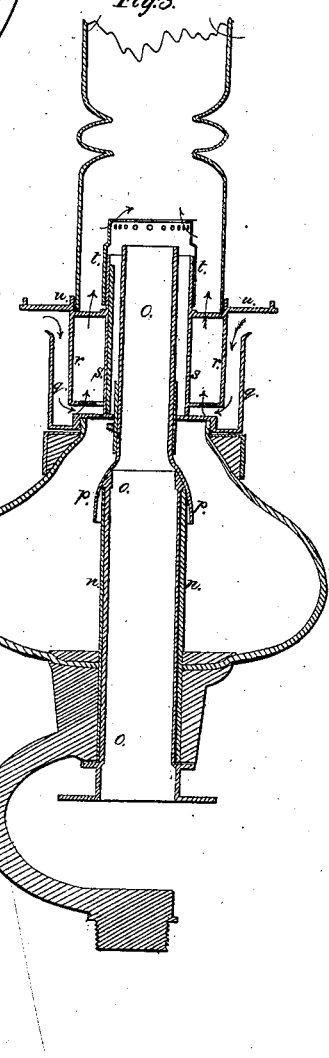

Figure 1 is a top view of the exterior of one modification of the lamp; and Fig. 2, a vertical section through the center of the same modification of the lamp; Fig. 3, is a section of the other modification of the lamp, suitable for burning camphene.

The nature of my invention consists in so conducting the air to the flame as to have it highly heated before it impinges on the flame, without the use of the button and in such a manner as to prevent its flaring, and also in the mode of raising and lowering the wick without revolving it by means of an upright screw that works into a nut on the bucket or thimble.

The construction is as follows: A large flat dish-formed reservoir ($a$) Figs. 1 and 2 is made for holding the ingredients to be burned around the upper edge of the rim ($b$) of this reservoir, which is vertical or at right angles to its flat bottom there is a rabbet into which the cover fits and on the outside are projections all around at proper intervals on which the spherical shade fits (shown by red lines in Fig. 2, ($s$),). In the center of the bottom of the reservoir there is a recess through which a tube ($c$) passes, and a flanch thereon fits the recess on the inside of the reservoir; and on the outside below there is a nut ($d$) screwed that keeps it tight and serves the purpose of a stuffing box. Through this tube the air passes to the center of the flame like the common Argand lamp, and on to the upper part thereof the thimble slides; where the tube is turned down smaller to receive it, a small screw ($e$) runs up through the thick part of the tube into the nut on one side of the thimble ($f$), and by turning said screw the thimble is elevated or depressed and carries the wick which is attached thereto with it. The cover ($g$) of the reservoir above named is made to fit into the rabbet and a flanch ($h$) on the underside of it fits the side of the rim ($b$) on the upper side of the cover. There is also a similar flanch ($i$) at the same distance from the edge, leaving a small groove at the joint so that any oil that may run up through, by tipping the lamp, shall not run over the top. At the center of this cover there is a deep recess ($k$) and a hole in it around which a flanch ($l$) rises to a level with the top, or nearly so; outside the flanch, a deflector ($m$) fits on, (hereafter more fully described), a space being left between it and the bottom for the air to pass, (as denoted by the red arrows in the drawings, Fig. 2).

Over the deflector a glass chimney is put of the following construction: It rises straight from the bottom, above the deflector; it is then suddenly contracted and then immediately expands, and after a small curve upward again contracts as before, it then swells out after which it gradually tapers to the top.

Fig. 3 shows a modification of my lamp suitable for burning camphene; the reservoir of this lamp may be of any desired form, and through its center a tube ($n$) rises nearly to the top and is firmly attached to the bottom; inside of this there is another tube ($o$) that extends down below the bottom and rises up to a sufficient height above the top to form the tube of the burner; a flanch or cup ($p$) is attached to this tube just above the top of the stationary one and shuts down over it. Above the reservoir of the lamp the cup ($q$) is screwed that forms the director and heater of the current which is made to impinge on the outside of the flame; within this cup is a second one ($r$) that extends down nearly to the bottom of it, but leaving sufficient space between the two for the air to descend, which then passes up through holes in the bottom of the inner cup. Around the outside of the tube ($s$) which is connected with the two cups and surrounding the tube ($o$) above named that extends up to the burner on to the top of the tube ($s$), a deflector ($t$) is fixed the upper edge of which turns inward toward the flame; just below this edge there is a row of holes through the deflector all around that admit the air and cause it to impinge upon the flame before the flame before passing through the deflector, thus producing a flame fluted in its appearance, clear, and bright.

The lamp chimney as above described fits the inner cup from which projects outward over the edge of the outer cup a glass holder (*u*) of the usual form. The air is supplied to the center of the flame in the usual way.

Having thus fully described my improvement, what I claim therein as new and desire to secure by Letters Patent is—

1. Constructing the reservoir in the manner described (and shown in Figs. 1 and 2) so as to prevent the oil from leaking out over the cover while a flat, broad receiver is retained, as herein set forth.

2. I also claim the raising and lowering of the thimble or wick holder by means of the screw, constructed, arranged, and combined as herein set forth.

3. I claim the cup or sunken chamber for heating or supplying air to the outside of the flame of an Argand lamp, as specified.

4. I also claim constructing the deflector with holes around and below its upper edge, in the manner and for the purpose described.

5. I also claim the lamp chimney formed of glass, with two contractions, substantially as above made known.

T. F. STRONG.

Witnesses:
 JOHN COX,
 THOMAS DAY.